(12) United States Patent
Cowey

(10) Patent No.: US 7,478,801 B2
(45) Date of Patent: Jan. 20, 2009

(54) VEHICLE LOADING DOCK FENDER ASSEMBLY

(75) Inventor: Steven John Cowey, 24 Ninth Street, Wingfield, 5013, South Australia (AU)

(73) Assignee: Steven John Cowey, South Australia (AU)

( * ) Notice: Subject to any disclaimer, the term of this patent is extended or adjusted under 35 U.S.C. 154(b) by 222 days.

(21) Appl. No.: 10/540,074

(22) PCT Filed: Sep. 15, 2003

(86) PCT No.: PCT/AU03/01204

§ 371 (c)(1),
(2), (4) Date: Jun. 22, 2005

(87) PCT Pub. No.: WO2004/058611

PCT Pub. Date: Jul. 15, 2004

(65) Prior Publication Data

US 2006/0049558 A1    Mar. 9, 2006

(30) Foreign Application Priority Data

Dec. 24, 2002  (AU) .............................. 2002953528

(51) Int. Cl.
*E02B 3/22* (2006.01)
(52) U.S. Cl. .................. 267/140; 114/219; 405/212
(58) Field of Classification Search .......... 267/140, 267/153, 139, 116, 257, 33, 292, 152; 104/29, 104/30; 405/215, 212; 114/29, 30, 219
See application file for complete search history.

(56) References Cited

U.S. PATENT DOCUMENTS 2,799,494 A * 7/1957 Pollock ...................... 267/140
2,879,985 A * 3/1959 Waddell et al. ............. 267/139
3,197,189 A * 7/1965 Pemper et al. .............. 267/140
3,375,625 A    4/1968 Edkins et al.
3,608,882 A * 9/1971 Culp .......................... 267/140
4,227,832 A * 10/1980 Leone et al. ................ 405/215

(Continued)

FOREIGN PATENT DOCUMENTS

AU    142894 S    2/2001

(Continued)

*Primary Examiner*—Christopher P Schwartz

(57) ABSTRACT

The invention relates to a loading dock fender unit (12) which is adapted for attachment adjacent a dock leveller (11) of a loading dock (10), the fender unit comprising a mounting plate (13), an elongate track (19) fixed to and projecting from the front face of the mounting plate (13) centrally thereof, a solid rubber or rubber like fender (15) guided for vertical sliding movement along the track (19), and a spring loaded fender restraining mechanism (16) which supports the fender in a normal at rest position and is arranged to resist movement of the fender (15) when displaced downwards from the normal at rest position by an externally applied force. In use, when a vehicle trailer is backed up against the dock with its rear end making contact with the fender (15), any up or down movement of the trailer rear end will cause simultaneous up or down movement of the fender (15). Desirably, the fender (15) can slide upwards unrestrained by the spring loaded restraining mechanism from its normal at rest position, and return to such position under its own weight (with the external lifting force having been removed).

5 Claims, 5 Drawing Sheets

U.S. PATENT DOCUMENTS

| | | | | |
|---|---|---|---|---|
| 4,548,150 | A | * 10/1985 | Drewett | 114/219 |
| 5,074,407 | A | * 12/1991 | Brumby | 198/841 |
| D381,176 | S | * 7/1997 | Patois et al. | D34/29 |
| 5,762,016 | A | 6/1998 | Parsons | |
| D516,992 | S | 3/2006 | Cowey | |
| 7,090,206 | B2 * | 8/2006 | Chase | 267/139 |

FOREIGN PATENT DOCUMENTS

| | | |
|---|---|---|
| AU | 3125/02 | 10/2002 |
| AU | 3932/02 | 12/2002 |
| DE | 29600207 U | 2/1996 |
| DE | 29600207 U1 | 2/1996 |
| DE | 19548121 | 8/1996 |
| DE | 19525308 | 1/1997 |
| DE | 19525308 A1 | 1/1997 |
| FR | 2686913 | 8/1993 |
| FR | 2686913 A1 | 8/1993 |
| FR | 2732291 | 10/1996 |
| GB | 2102098 * | 1/1983 |
| GB | 2207213 * | 1/1989 |
| GB | 2214607 * | 9/1989 |
| GB | 2351137 A | 12/2000 |
| SE | 510 800 | 6/1999 |
| SE | 510 800 C | 6/1999 |
| WO | WO 88/08403 | 11/1988 |
| WO | WO 2004/058611 A1 | 7/2004 |

* cited by examiner

VEHICLE LOADING DOCK FENDER ASSEMBLY

CROSS REFERENCE TO RELATED APPLICATIONS

The present application is a National Stage Application claiming the priority of co-pending PCT Application No. PCT/AU2003/001204 filed Sep. 15, 2003, which in turn, claims priority from Australian Patent Application Serial No. 2002953528, filed Dec. 24, 2002. Applicants claim the benefits of 35 U.S.C. § 120 as to the PCT application and priority under 35 U.S.C. § 119 as to the said Australian application, and the entire disclosures of both applications are incorporated herein by reference in their entireties.

This invention relates to an improved fender assembly for protecting vehicle loading docks against damage during the loading or unloading of the trailers. The invention however is not restricted to vehicle loading docks and may have application in the marine industry where boats or houseboats dock against a wharf or pontoon, and where relative movement occurs between a fixed surface and a moving surface.

With the introduction of air bag suspension trailers, the rate of damage to truck loading docks and the trailers themselves has increased quite dramatically. The movement of the trailer against the fixed dock as the trailer is unloaded or loaded, can cause quite significant damage to the dock structure and/or rear end of the trailer, thereby escalating the cost of maintenance. It will be appreciated that vehicle trailers which incorporate air bag suspensions can rise and fall quite substantially as the air bags either inflate or deflate, i.e. when the loading on the trailer respectively increases or decreases. For example, during the loading/unloading of freight trailers, it is common practice for forklift vehicles to be driven onto the trailer and as a consequence, the loading on the trailer is dramatically increased. This results in air being dumped from the suspension air bags resulting in a lowering of the trailer. When the fork lift truck is driven off the trailer, the reduction in loading on the trailer results in pressure air being readmitted into the air bags and as a consequence the trailer is caused to rise. This rise and fall movement, with the rear end of the trailer making contact against the dock, can cause a significant amount of damage to the dock structure (and the trailer).

In order to minimise such damage, it is common practice for truck loading docks to have fixed on either side of the dock leveller a solid block of rubber mounted vertically by two bolts which are welded to a mounting surface on the dock. These rubber blocks, however, are fixed with respect to the dock and, in use, tend to deteriorate quite quickly as a result of forces applied thereagainst by the vehicle trailer rear end and the relative movement which occurs between the fixed blocks and the trailer. The damage to the blocks causes the bolts to become exposed and bent.

It would be advantageous to have dock fenders mounted on opposite sides of the dock leveller and which are able to move up and down substantially in unison with the rise and fall of the trailer.

Broadly according to this invention therefore, a dock fender assembly is adapted for attachment to a fixed support surface on the dock at a predetermined height above the ground, said fender assembly comprising a vertically disposed elongate fender guided for slidable movement along a vertical guide track fixed with respect to the dock support surface, and a spring loaded fender restraint mechanism co-acting with and adapted to resist movement of the fender when displaced downwards from a normal at rest position by an externally applied force and movable between a retracted position wherein the fender is supported in its normal at rest position and an extended position wherein the fender is displaced downwards from said at rest position.

Desirably, the fender is able to slide upwards along the guide track from its said normal at rest position, unrestrained by the restraint mechanism, by a predetermined distance.

More specifically, according to this invention, a fender assembly for attachment to a fixed support surface of a truck loading dock comprises:

a mounting securable to the support surface,
a vertical fender guide track secured to and extending longitudinally of the mounting,
a vertically disposed slidable elongate fender or bumper having front and rear faces, guided for slidable movement along said guide track from a normal at rest position on the track in either an upwards or downwards direction,
a fender restraining member movable between a retracted position in which the fender is supported in its said normal at rest position and an extended position spaced vertically downwards from said retracted position, and
bias means operatively associated with said fender restraining member for biasing same in the direction of its retracted position, arranged so that, in use, when an external downwards force is applied to the fender in its at rest position, the fender will slide downwardly along said track against the resistance of the bias means.

Desirably, the fender and the guide track are approximately co-extensive and the fender is able to slide upwards along the track from its said normal at rest position under the influence of an external upwards force applied to the fender. Upon the removal of the upwards force, the fender is designed to return to its at rest position under its own weight.

Preferably the fender restraining member comprises a vertically slidable U-shaped rod which straddles the mounting frame and has a pair of upstanding legs extending along opposite sides of the fender, and a bridging portion extending across the underside of the fender in contiguous or near contiguous relationship therewith, said bridging portion having an abutment fast therewith in abutting relationship with the underside of the fender whereby any downwards movement of the fender causes simultaneous downward movement of the U-shaped rod, wherein each said upstanding leg supports and locates a compressible coil spring extending along its length.

Preferably the fender is a solid rubber block which has a T-shaped key-way extending along its rear face, centrally thereof, said keyway engaging a complementary shaped track on the mounting frame.

Preferably the mounting comprises a flat planar plate or a channel section plate which is fixable to a dock mounting surface by means of welding.

Desirably the U-shaped rod is guided for vertical sliding movement with respect to the mounting plate by means of pair of tubular sleeves fixed on opposite sides of the mounting plate adjacent the bottom corners thereof, each said upstanding leg passing through a respective said sleeve, with each of the coil springs having its lower end abutting against the upper end of its associated sleeve.

Preferably the upper end of each upstanding leg is threaded and threadably receives a retention nut against which the upper end of a respective spring abuts.

Desirably there are two fender assemblies, one on each side of the dock leveller of the dock. The dock leveller normally includes a hinged flap pivotal between a depending out-of-use position and a raised substantially horizontal position where it bridges a platform on the dock and the rear end of the trailer.

In use, with the trailer backed up against the dock and its rear end making pressure contact against the fenders, any rise or fall movement of the trailer will cause the fenders to rise or fall respectively in unison. Any relative movement between the fenders and the trailer rear end is avoided.

In order to more fully describe the present invention, a preferred embodiment thereof is described hereunder in some further detail wherein:

FIG. 4 is a perspective view of one of the fender units shown in FIGS. 1 and 2, while;

Figure 1:
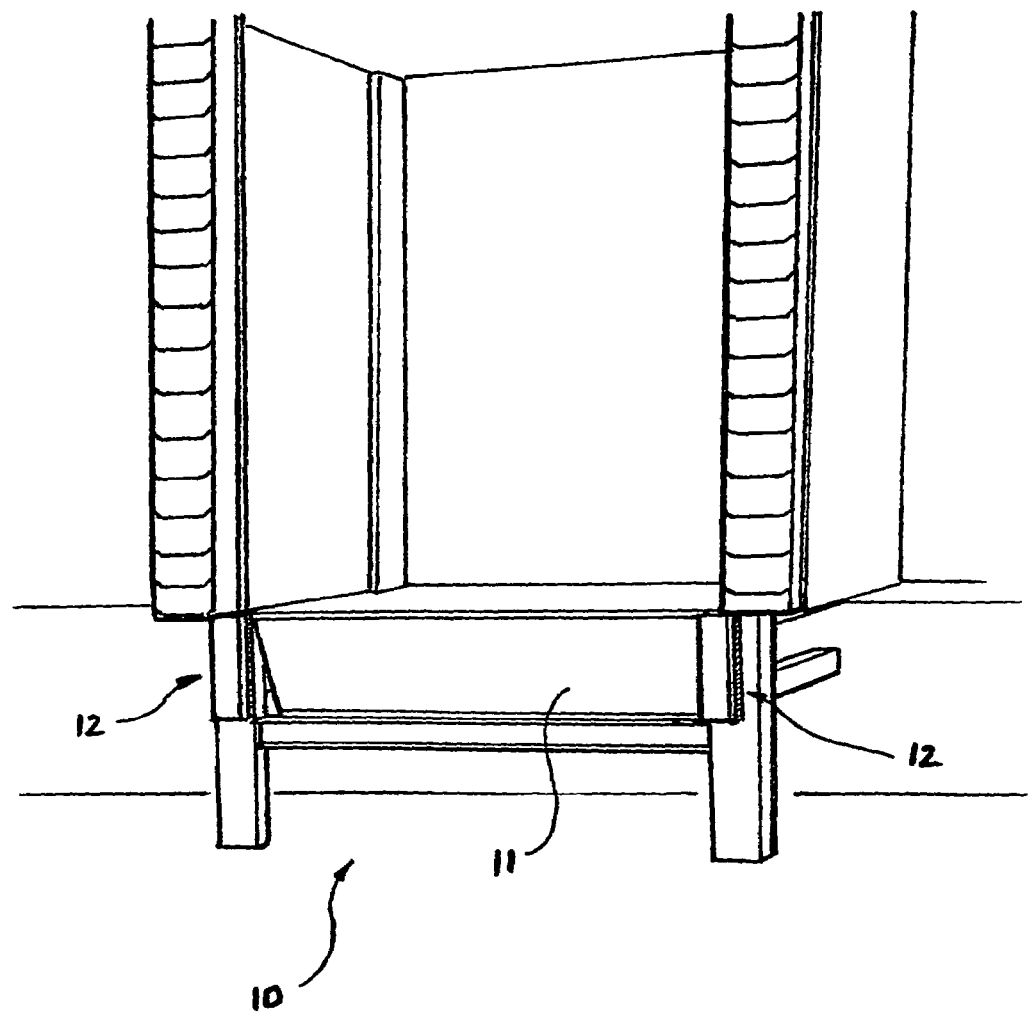
FIG. 1 is a perspective view of a truck loading dock having a pair of fender units made in accordance with the present invention mounted adjacent opposite sides of the dock leveller.
Figure 2:
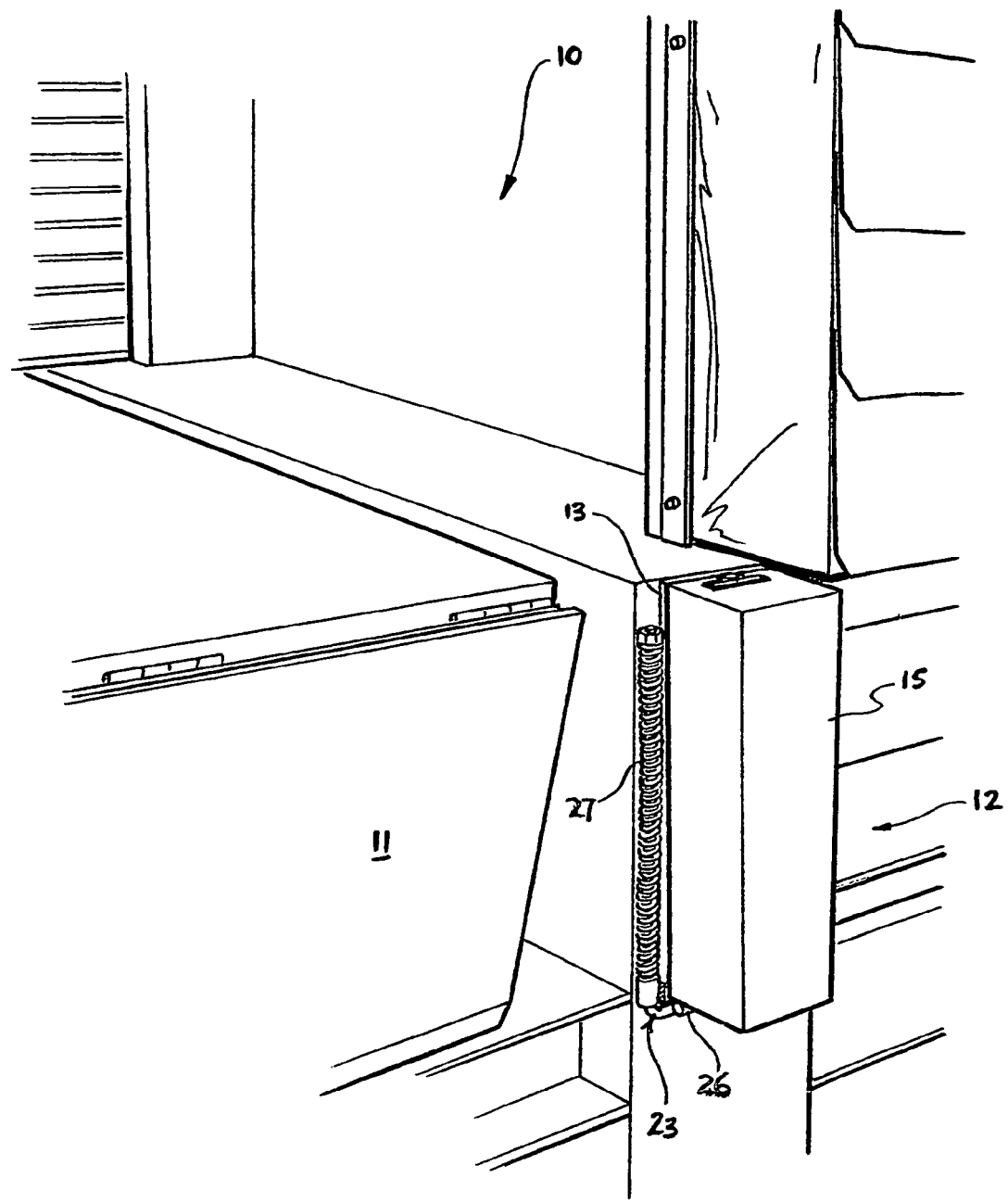
FIG. 2 is a fragmentary perspective view of the assembly shown in FIG. 1.
Figure 3:
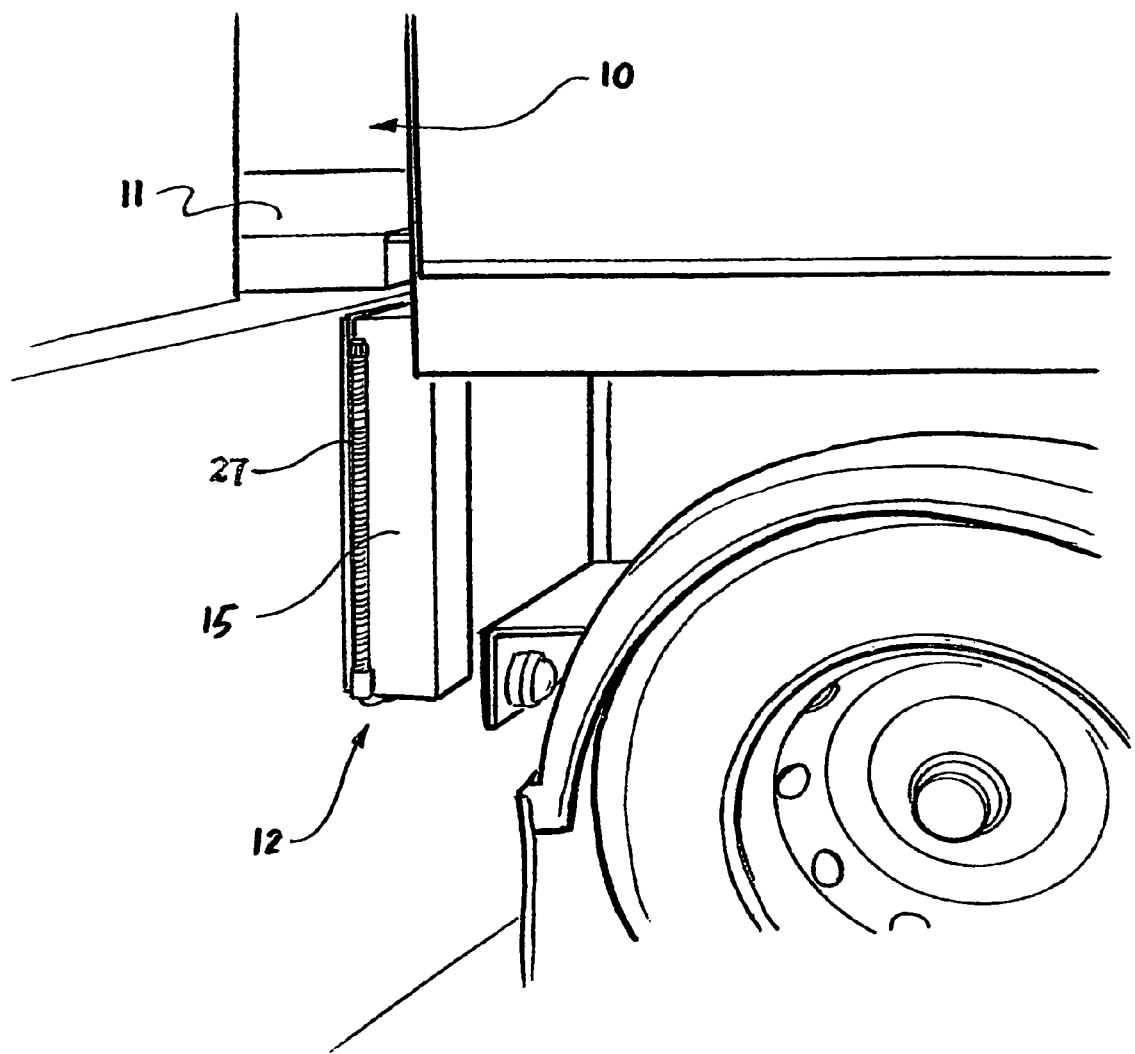
FIG. 3 is a perspective view of part of the assembly shown in FIG. 1 with a vehicle trailer abutting against the fenders, with the dock leveller in its raised position.

Referring to FIGS. 1 to 3 of the accompanying drawings, there is shown a truck loading dock 10 which typically includes a hinged dock leveller 11 and a pair of fender units 12 mounted on opposite sides of the leveller 11. The dock leveller, when in use, is in a raised substantially horizontal position where it bridges between the dock platform and the rear end of the vehicle trailer (as shown in FIG. 3).

Each fender unit 12 has a planar attachment plate 13 which is fixed to a vertical support surface on the dock by means of welds, a solid rubber fender 15 guided for vertical sliding movement with respect to the mounting plate 13, and a spring loaded restraining mechanism 16 which supports the fender 15 in a normal at rest position on the frame at a predetermined height above the ground and which resists any movement of the fender 15 downwards from its normal at rest position.

Figure 4:
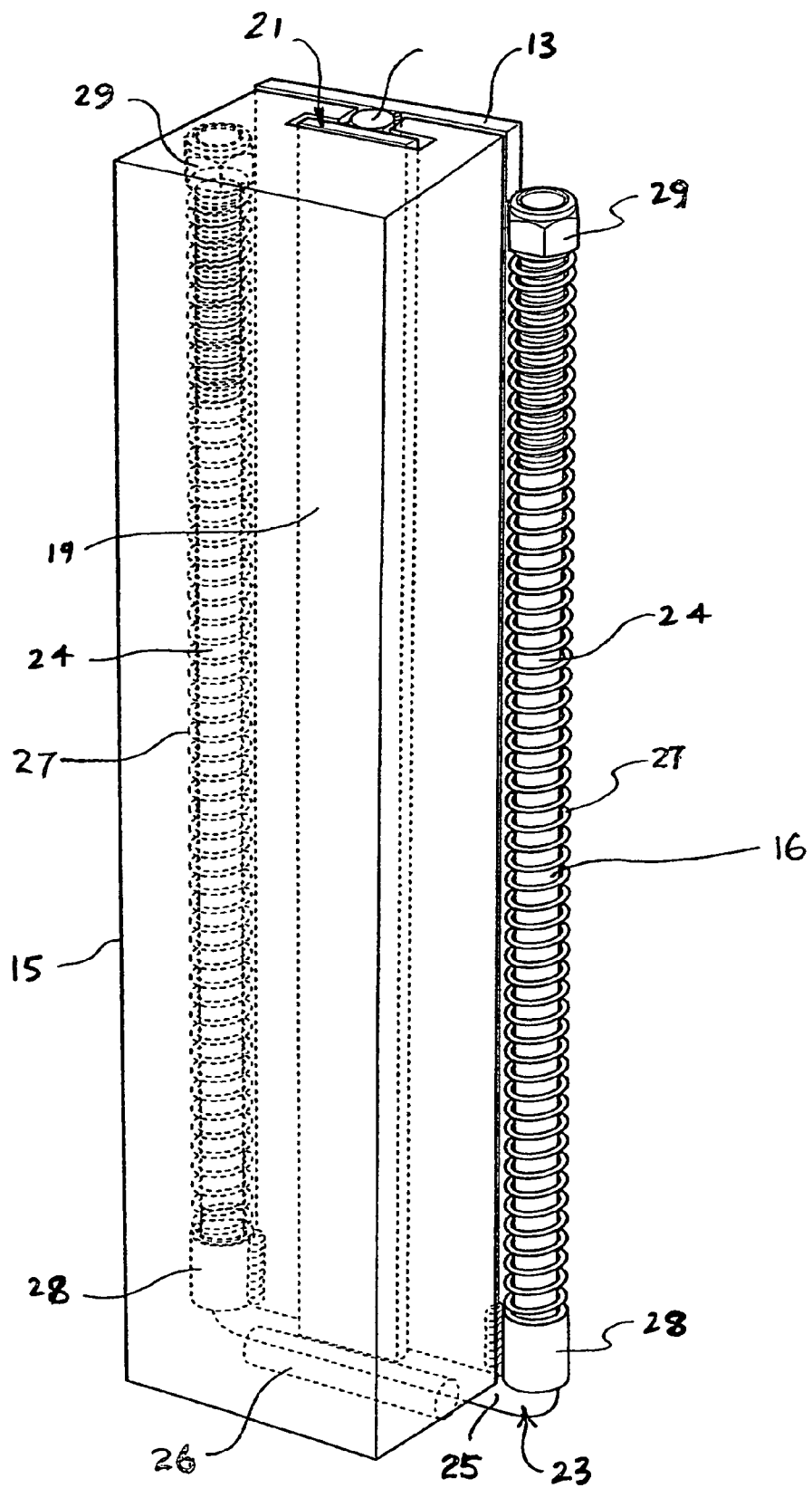
Figure 5:
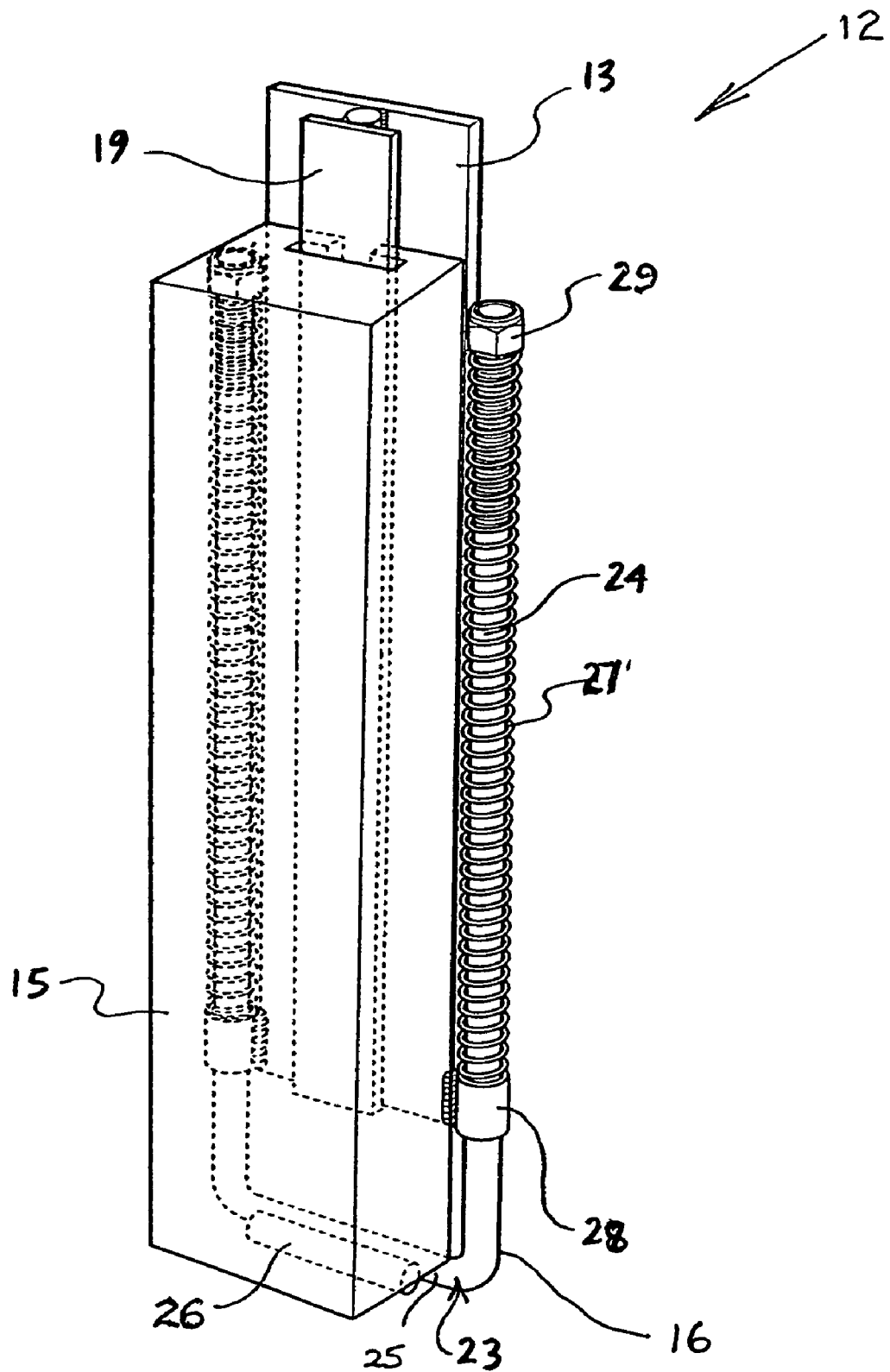
FIG. 5 is a perspective view of the fender unit shown in FIG. 4, in a downwardly displaced position.

As shown in FIGS. 4 and 5 of the drawings, the fender 15 is slidable along a planar track 19 which is fixed to the front face of the mounting plate 13 centrally thereof, the track 19 engaging within a complementary shaped keyway 21 formed in the rear face of the block 15 and which extends between its top and bottom ends. The fender restraining mechanism 16, in this embodiment, comprises a U-shaped rod 23 which straddles the fender 15 with its two spaced apart upstanding legs 24 extending along opposite sides thereof, with the upstanding legs 24 being joined by a bridging portion 25 which extends across the underside of the fender 15, the bridging portion 25 having a fender abutment member 26 which abuts the underside of the fender and supports the fender in its normal at rest position. Each of the upstanding legs 24 locates and supports a heavy compression spring 27 which has its lower end abutting against a short length tubular sleeve 28 welded to a bottom corner of the attachment plate 13 and its upper end abutting against a retention nut 29 which is threaded onto the upper end of the rod 24. This also provides adjustment of the spring pressure.

The installation of the fender units 12 to the dock is quite simple. The mounting plate 13 together with the fender restraining mechanism is fixed to a support surface on the dock at the required location and thereafter the fender 15 is simply slidably fitted onto its track 19 from the top thereof. When a fender 15 requires to be replaced with a new one, this can be achieved very easily and conveniently without any dismantling of the unit.

In use, when a trailer is backed up against the dock with its rear end making pressure contact with the fenders 15, any up or down movement of the trailer rear end will cause simultaneous up or down movement of the fenders 15. While the fenders 15 can slide upwards unrestrained by the springs 27, from their normal at rest position, any downwards movement therefrom is resisted by the compression springs 27. This ensures that if the trailer moves away from the dock with the fenders 15 displaced downwards, they will return automatically to their normal at rest positions. If a similar situation occurs where the fenders 15 are displaced above their at rest positions, the fenders 15 return to their normal at rest positions under their own weight.

It would of course be appreciated that a number of alterations or modifications may be made to the sliding dock fender units without departing from the true spirit or scope of the present invention. For example the coil springs 27 need not necessarily be mounted adjacent opposite sides of the fender blocks 15 and could, for example, be mounted rearwardly thereof. In addition the interengagement of the fender block 15 and its guide track 17 on the mounting frame can be effected in a number of different ways; however these and other variations will be seen to clearly lie within the scope of the present invention.

A brief consideration of the above described embodiment will indicate that the invention provides for a very simple, inexpensive, and easily installed sling fender unit which is particularly suited for protecting loading docks against damage from air bag suspension trailers which undergo significant vertical movement with respect to the dock during unloading/loading thereof. The fender unit of the present invention has a minimum number of moving components which are designed to be substantially damage resistant.

The claims defining the invention are as follows:

1. A fender assembly adapted for attachment to a fixed support surface of a dock structure at a predetermined height above the ground, said fender assembly comprising: a pair of laterally spaced apart parallel fender sub-assemblies, each sub-assembly comprising:

a vertical guide track which, in use, is fixed with respect to the support surface, a vertically disposed elongate fender guided for slidable movement along said guide track by a longitudinally extending keeper portion co-operable with the guide track, and spring loaded fender restraining means co-acting with and adapted to resist movement of the fender when displaced downwards from a normal at rest position by an externally applied force, said fender restraining means being movable between a retracted position wherein the fender is supported in its said normal at rest position and an extended position wherein the fender is displaced downwards from said at rest position, the fender restraining means comprising a vertically slidable U-shaped rod which has a pair of upstanding legs extending along opposite sides of the fender, and a transversely extending bridging portion interconnecting the legs, said bridging portion having a forwardly projecting abutment secured thereto and abutting the fender whereby any downwards movement of the fender causes simultaneously downward movement of the U-shaped rod, and wherein said restraining means includes a pair of compressible coil springs each supported on a respective said upstanding leg and extending along its length, wherein each fender sub-assembly is operable independent of the other of the pair.

2. A fender assembly according to claim 1 wherein the fender of each sub-assembly is a solid rubber or rubber-like block and wherein the keeper portion comprises a slotted keyway extending centrally along a rear face of the block, said guide track slidably engaging within said keyway.

3. A fender assembly according to claim 2 wherein the keyway of each sub-assembly extends between top and bottom faces of the fender and said guide track has a length which approximates the length of the keyway, and wherein said abutment is located adjacent a lower end of the track when the fender restraining means is in its retracted position.

4. A fender assembly according to claim 3 wherein said U-shaped rod of each sub-assembly is guided for vertical sliding movement by means of a pair of tubular sleeves fixed on opposite sides of the mounting plate adjacent bottom corners thereof, each said upstanding leg passing through a respective said sleeve, with each of the coil springs having its lower end abutting against the upper end of its associated said sleeve.

5. A fender assembly according to claim 4 wherein the upper end of each said upstanding leg is threaded and threadably receives a retention nut against which the upper end of a respective said spring abuts.

* * * * *